(12) United States Patent
Otte et al.

(10) Patent No.: US 7,782,720 B2
(45) Date of Patent: Aug. 24, 2010

(54) METHOD FOR DRIVING AN ACTUATOR, ACTUATOR DRIVE, AND APPARATUS COMPRISING AN ACTUATOR

(75) Inventors: Rob Otte, Eindhoven (NL); Johan Cornelis Compter, Eindhoven (NL); Franciscus Lambertus Maria Cremers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 511 days.

(21) Appl. No.: 10/540,687

(22) PCT Filed: Dec. 4, 2003

(86) PCT No.: PCT/IB03/05731

§ 371 (c)(1), (2), (4) Date: Jun. 24, 2005

(87) PCT Pub. No.: WO2004/059649

PCT Pub. Date: Jul. 15, 2004

(65) Prior Publication Data

US 2006/0104162 A1   May 18, 2006

(30) Foreign Application Priority Data

Dec. 30, 2002   (EP) .................................. 02080577

(51) Int. Cl.
*G11B 7/00* (2006.01)

(52) U.S. Cl. .................................................. 369/44.14
(58) Field of Classification Search ................... 369/58, 369/49, 47, 43–44, 44.11, 45, 50, 44.28, 369/44.29, 44.35; 360/77.01, 75
See application file for complete search history.

(56) References Cited

U.S. PATENT DOCUMENTS

| 3,655,988 | A | * | 4/1972 | Nakamura et al. | ........ 250/208.4 |
| 4,783,774 | A | * | 11/1988 | Enomoto | .................. 369/44.27 |
| 4,805,519 | A | * | 2/1989 | Boddey et al. | .............. 454/256 |
| 5,301,174 | A | * | 4/1994 | Matoba et al. | ........... 369/44.28 |
| 5,635,848 | A | * | 6/1997 | Hammond et al. | .......... 324/758 |
| 6,118,613 | A | * | 9/2000 | Kojima | ........................ 360/75 |

FOREIGN PATENT DOCUMENTS

| EP | 0237682 A1 | 9/1987 |
| EP | 1202423 A2 | 5/2002 |
| JP | 60236125 | 11/1985 |

\* cited by examiner

*Primary Examiner*—Peter Vincent Agustin (57) ABSTRACT

An actuator driver circuit includes a drive signal source and an electrical damping element having a negative resistance connected in series with the drive signal source. A controllable switch is provided for selectively switching the electrical damping element into or put of a signal path from a drive signal source output to a driver circuit output, in order to selectively change the electrical damping of an actuator. For example, the electrical damping of a radial actuator or a focus actuator of an optical disc drive is increased in case of loss of track or loss of focus.

20 Claims, 5 Drawing Sheets

METHOD FOR DRIVING AN ACTUATOR, ACTUATOR DRIVE, AND APPARATUS COMPRISING AN ACTUATOR

The present invention relates in general to a method for driving an actuator. Specifically, but not exclusively, the present invention relates to an optical disc drive which comprises actuators for optical beam focussing, for track following, for tilting an optical pickup, etc. Therefore, in the following, the invention will be specifically explained for such application. However, it is noted that this explanatory application is not to be understood as limiting the use of the present invention, as the present invention can be used in various applications.

As is commonly known, an optical storage disc comprises at least one track, either in the form of a continuous spiral or in the form of multiple concentric circles, of storage space where information may be stored in the form of a data pattern. Optical discs may be read-only type, where information is recorded during manufacturing, which information can only be read by a user. The optical storage disc may also be a writable type, where information may be stored by a user. A disc drive apparatus for writing/reading information into/from an optical storage disc will hereinafter also be indicated as "optical disc drive". Since the technology of optical discs in general, the way in which information can be stored in an optical disc, and the way in which optical data can be read from an optical disc, is commonly known, it is not necessary here to describe this technology in more detail.

For writing information in the storage space of the optical storage disc, or for reading information from the disc, an optical disc drive comprises, on the one hand, rotating means for receiving and rotating an optical disc, and on the other hand, for scanning the storage track of the rotating disc, the optical disc drive comprises a light beam generator device (typically a laser diode), an objective lens for focussing the light beam in a focal spot on the disc, and an optical detector for receiving the reflected light reflected from the disc and for generating an electrical detector output signal.

During operation, the light beam should remain focussed on the disc. To this end, the objective lens is arranged axially displaceable, and the optical disc drive comprises focal actuator means for controlling the axial position of the objective lens. Further, the focal spot should remain aligned with a track or should be capable of being positioned with respect to a new track. To this end, at least the objective lens is mounted radially displaceable, and the optical disc drive comprises radial actuator means for controlling the radial position of the objective lens.

In practice, it may happen that a disc is tilted with respect to its rotation axis. For better playability, many disc drives have the objective lens mounted such that it can be tilted, and comprise a tilt actuator for controlling the tilt position of the objective lens.

The performance of actuators depends strongly on the parameters of the actuators themselves. It is, however, not always possible to accurately determine all actuator parameters: the parameters of different actuators will always show a certain amount of mutual difference, caused by tolerances during manufacturing. Also the actuator parameters may depend on influences from the surroundings, such as for instance temperature. It is desirable that an actuator system is robust with a view to parameter variations.

An important requirement to an actuator is its speed. The actuator should be capable of quickly following deviations or displacements of the track. On the other hand, it may happen that an actuator looses its target position, in which case the actuator should be capable of quick recovery and quickly finding its target position again. For instance, it may happen that the objective lens looses its track and/or becomes out-of-focus due to, for instance, an external mechanical shock. But also when a disc drive apparatus is switched on, the actuators need to quickly find a defined position. Further, if the objective lens is to be displaced towards another track, such displacement should be as quick as possible.

Under normal circumstances, when the actuator is at its target position, the stability of the actuator control is enhanced by a controller receiving information on actual position in a feedback loop. Deviations between actual position and target position are usually small, and any corrective action can be small. If the actuator has lost its target position, for instance caused by mechanical shock, or has not yet reached any defined position, for instance during an initializing phase of operation, or is to be displaced to another position, for instance in a jump from one track to another, the displacement distances can be relatively large, and overshoot may easily occur.

Under normal circumstances, the deviation from a target position is relatively small, and a servo system is capable of controlling the actuator on the basis of an error signal indicating the magnitude of the deviation between actual position and target position. Such error signal is, however, only available for relatively small deviations; once the deviation is too large, the servo system can not control the actuator any more due to absence of the error signal.

Mechanical shocks are particularly problematic in the case of a disc drive apparatus mounted in a moving vehicle, such as an automobile. In that case, the mechanism may be subjected to frequent shocks and vibrations, depending on road conditions, leading to large position deviations of the actuator, so that it may be very difficult for an actuator to recover.

A main objective of the present invention is to overcome these problems.

According to an important aspect of the present invention, an actuator is provided with an electronic damping circuit.

According to a preferred aspect of the present invention, such electronic damping circuit provides a negative resistance in an actuator drive loop.

According to a further preferred aspect of the present invention, such electronic damping circuit is controllable to be switched on or off, or to adapt the negative resistance value, depending on the condition of the actuator and the need for increased damping.

These and other aspects, features and advantages of the present invention will be further explained by the following description of the present invention with reference to the drawings, in which same reference numerals indicate same or similar parts, and in which.

Figure 1:
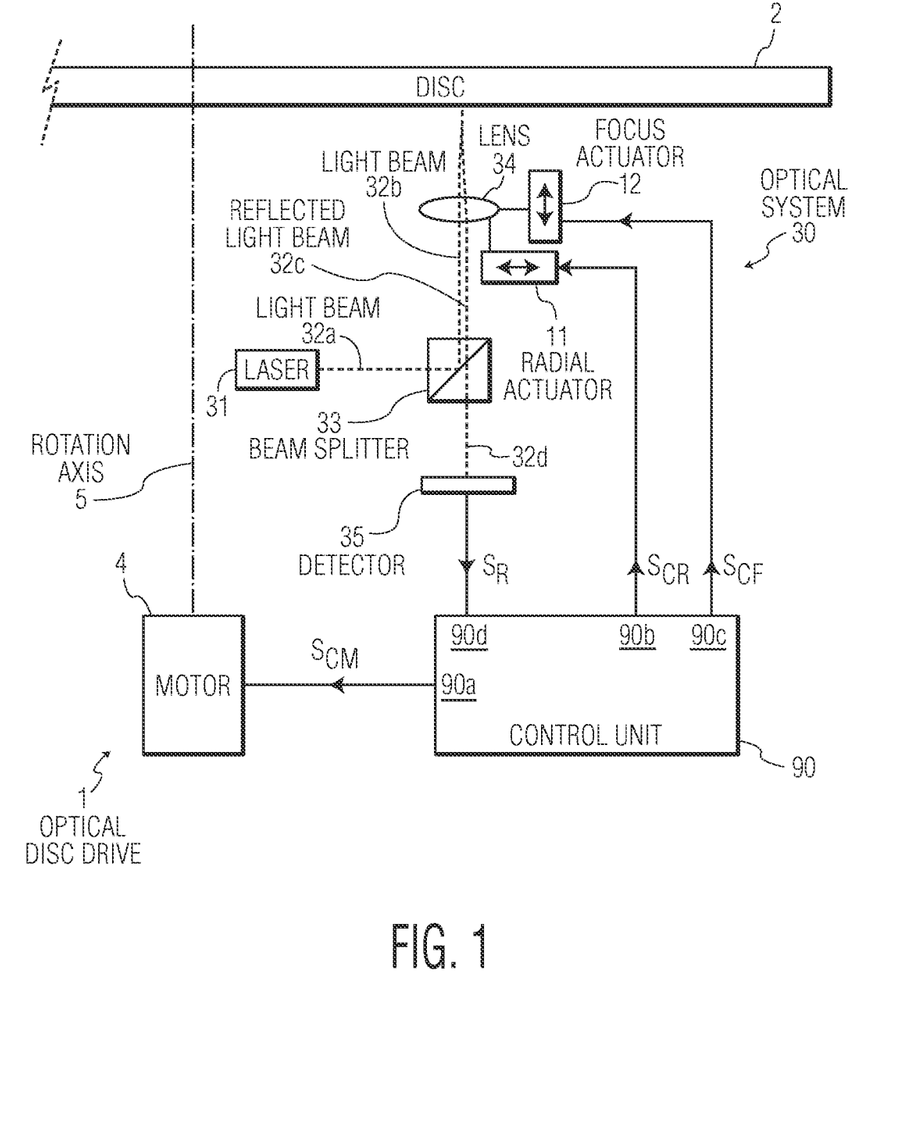
FIG. 1 schematically shows an optical disc drive

FIG. 1 schematically shows an optical disc drive 1, suitable for storing information on or reading information from an optical disc 2. The disc drive apparatus 1 comprises a motor 4 defining a rotation axis 5.

The disc drive apparatus 1 further comprises an optical system 30 for scanning tracks (not shown) of the disc 2 by an optical beam. More specifically, the optical system 30 comprises a light beam generating means 31, typically a laser such as a laser diode, which is arranged to generate a light beam 32a which passes a beam splitter 33 and an objective lens 34. The objective lens 34 focuses the light beam 32b on the disc 2.

The disc drive apparatus 1 further comprises a radial actuator 11, designed for regulating the radial position of the objective lens 34. The disc drive apparatus 1 also comprises a focus actuator 12 arranged for axially displacing the objective lens 34 in order to achieve and maintain focusing of the light beam 32b exactly on the desired location of the disc 2. Since radial actuators and focus actuators are known per se, while the present invention does not relate to the design and functioning of such actuators, it is not necessary here to discuss the design and functioning of an actuator in great detail.

The light beam 32b reflects from the disc 2 (reflected light beam 32c) and passes the objective lens 34 and the beam splitter 33 (beam 32d) to reach an optical detector 35 which produces a read signal $S_R$.

The disc drive apparatus 1 further comprises a control unit 90 having a first output 90a connected to a control input of the motor 4, having a second output 90b coupled to an input of the radial actuator 11, and having a third output 90c coupled to an input of the focus actuator 12. The control unit 90 is designed to generate at its first output 90a a control signal $S_{CM}$ for the motor 4, to generate at its second control output 90b a control signal $S_{CR}$ for the radial actuator 11, and to generate at its third control output 90c a control signal $S_{CF}$ for the focus actuator 12.

As should be clear to a person skilled in the art, the read signal $S_R$ comprises at least one signal component which indicates the radial displacement of the objective lens 34 with respect to a track (target position of radial actuator), and also comprises at least one signal component which indicates a deviation of the objective lens 34 with respect to a focus condition (target position of focus actuator).

In the exemplary embodiment illustrated in FIG. 1, the control unit 90 further has a read signal input 90d for receiving the read signal $S_R$ from the optical detector 35, and the control unit 90 is designed to generate its actuator control signals $S_{CR}$ and $S_{CF}$ on the basis of the read signal $S_R$ from the optical detector 35, such as to keep the actuators in their respective target positions, as should be clear to a person skilled in the art.

Figure 2:
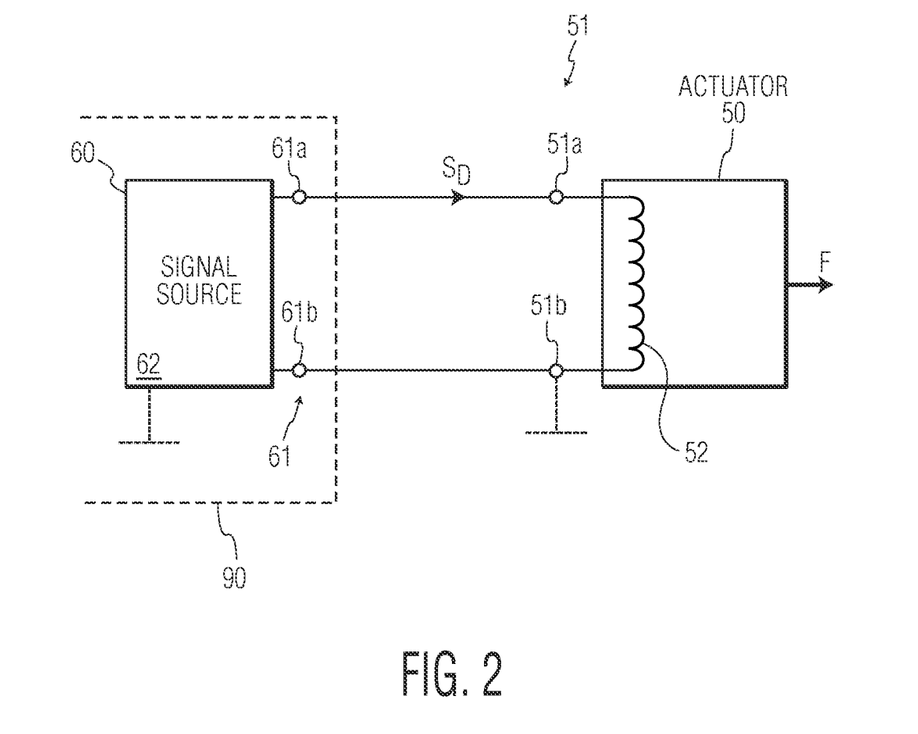
FIG. 2 is a block diagram illustrating a driving circuit for an actuator in general.

FIG. 2 is a block diagram illustrating in more detail the driving of an actuator in general; in this figure, the actuator is indicated by reference numeral 50, and can be considered to represent any of the actuators 11, 12 discussed above. Actuator 50 has an electrical input 51, comprising input terminals 51a and 51b, which connects to at least one actuator coil 52. The output of the actuator 50 is mechanical, consisting of a force and/or displacement applied to the objective lens 34, schematically represented by an arrow F.

A drive signal source 60, which is shown as part of the control unit 90, generates a drive signal $S_D$ for the actuator 50, which drive signal $S_D$ is provided at an output 61, comprising output terminals 61a and 61b. In the embodiment shown, a first actuator input terminal 51a is connected to a first source output terminal 61a while a second actuator input terminal 51b is connected to a second source output terminal 61b. Thus, the current loop for the drive signal $S_D$ is made visible. Normally, however, the drive signal source 60 does not have a separate second output terminal 61b, only the first output terminal 61a, whereas the drive signal source 60 has a reference terminal 62 connected to mass, as illustrated in dotted lines. A similar remark applies to the actuator 50. Then, the line connecting second source output terminal 61b to second actuator input terminal 51b may actually be constituted by mass itself.

In the following, the first actuator input terminal 51a will also be indicated as signal input terminal, while the second actuator input terminal 51b will also be indicated as mass terminal.

Said drive signal $S_D$ from drive signal source 60 can be considered to represent any of the actuator drive signals $S_{CR}$ and $S_{CF}$ discussed above. In response to said drive signal $S_D$, the actuator 50 displaces the objective lens 34. The actuator 50 exerts a certain force on said objective lens, and as a result the objective lens moves with a certain velocity v and acceleration a. The objective lens is subjected to a counter-force, proportional to its velocity v, which is called damping. Damping is partly caused by mechanical properties of the actuator-object system, and partly has an electrical origin, involving the back-EMF of the actuator coil 52.

As should be clear to a person skilled in the art, the quality factor Q of a system is a measure of the damping of such system, high Q corresponding to low damping. In the case of an actuator, the total quality factor $Q_T$ can be expressed as $$\frac{1}{Q_T} = \frac{1}{Q_M} + \frac{1}{Q_E}$$

wherein $Q_M$ represents mechanical contribution to damping and QE represents electrical contribution to damping. $Q_M$ and $Q_E$ will be referred to as mechanical and electrical quality factors, respectively.

It can be shown that the electrical quality factor $Q_E$ is proportional to the total electrical resistance $R_T$ in the current loop between drive signal source 60 and actuator 50, inductance and capacitance of the actuator coil 52 being neglected here. The total electrical resistance $R_T$ comprises a contribution $R_S$ from the source 60 (internal resistance $R_S$), a contribution $R_A$ from the actuator 50 (load resistance $R_A$), and a contribution $R_P$ from the path from source output 61 to actuator input 51 and back, according to $R_T = R_S + R_A + R_P$.

Electrical damping can be increased by decreasing the total electrical resistance $R_T$. In the prior art, even if the source 60 is designed to approach the behavior of an ideal voltage source, i.e. to have an internal resistance zero, the actuator 50 still provides a substantial resistance, setting limits to the amount of damping attainable.

According to the present invention, the total electrical resistance $R_T$ is reduced by incorporating an element with a negative resistance in the loop between source and actuator, so that $R_P < 0$. Such element will hereinafter be indicated as electrical damping element 100.

Figure 3A:
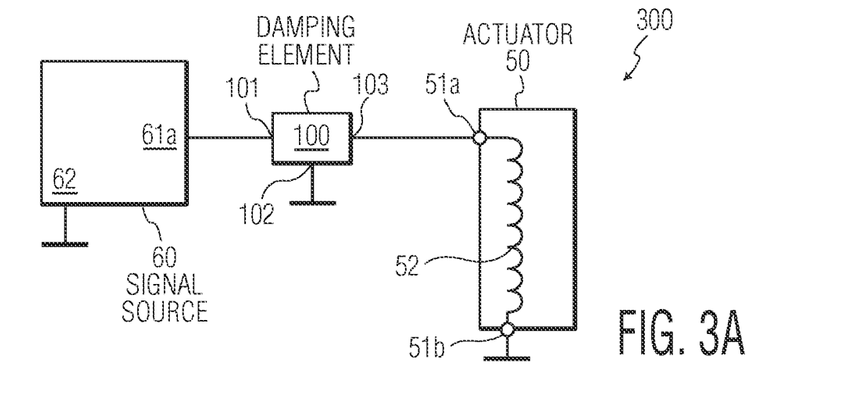
FIGS. 3A-B illustrate possible arrangements of a driver, an actuator and an electrical damping element.
Figure 3B:
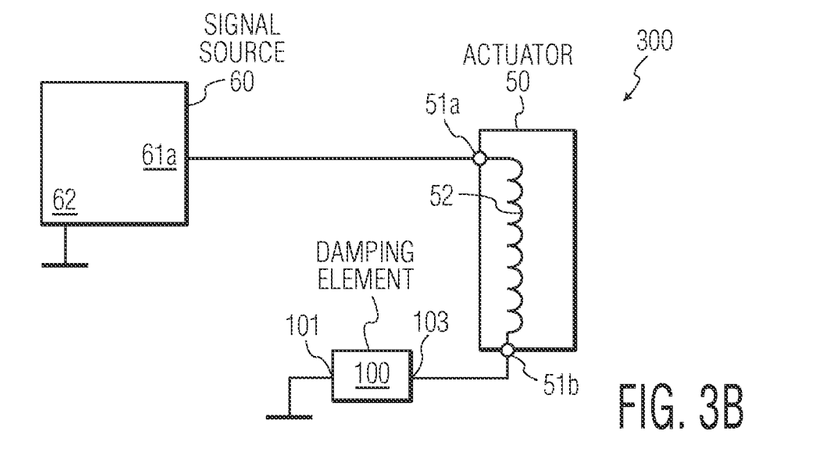
Figure 3C:
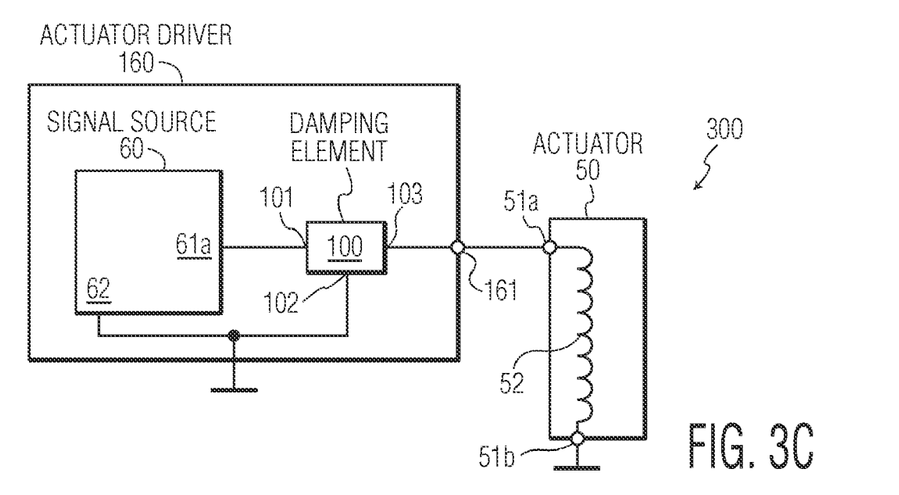
FIG. 3C illustrates a driver with a negative internal resistance.

FIGS. 3A-C illustrate an actuator assembly 300 comprising an actuator 50, a drive signal source 60, and an electrical damping element 100 arranged in a drive signal path between source 60 and actuator 50. FIG. 3A illustrates that such electrical damping element 100 can be arranged between driver output terminal 61a and signal input terminal 51a of the actuator 50. FIG. 3B illustrates that such electrical damping element 100 can be arranged between mass terminal 51b of the actuator 50 and mass.

The electrical damping element 100 can be implemented as a separate element, functioning as auxiliary negative resistance load in series with the actuator load 50. Thus, it is possible to add such electrical damping element 100 to existing actuator arrangements.

Based on the arrangement of FIG. 3A, it is also possible that the electrical damping element 100 is integrated with the source 60, as illustrated in FIG. 3C. The combination of such source 60 with such electrical damping element 100 can be considered as an actuator driver circuit 160, in which case the electrical damping element 100 functions as output stage. The internal resistance of this actuator driver circuit 160 includes the resistance of the electrical damping element 100, which is designed in relation to the internal resistance of the driver 60 such that the overall internal resistance of the actuator driver circuit 160 is negative.

Figure 4:
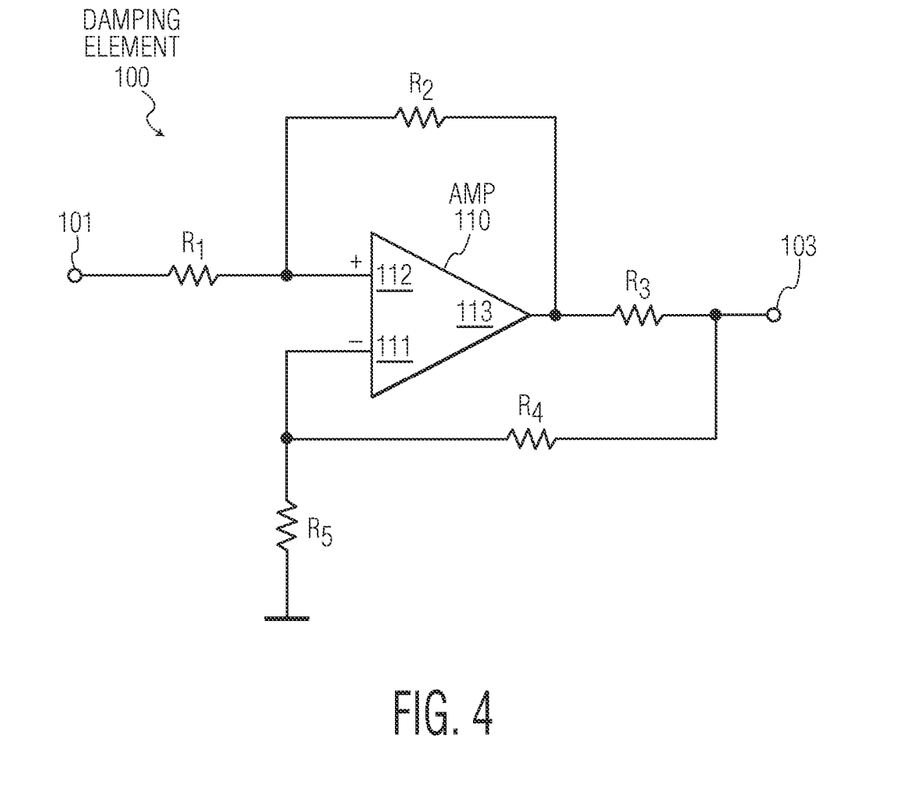
FIG. 4 is a block diagram illustrating an exemplary embodiment of an electrical damping element.

FIG. 4 shows an exemplary embodiment of an electrical damping element 100, having an input terminal 101 and an output terminal 103. In the arrangement of FIG. 3A, the input terminal 101 is connected to driver output terminal 61a while the output terminal 103 is connected to actuator signal input terminal 51a. In the arrangement of FIG. 3B, the input terminal 101 is connected to actuator mass terminal 51b while the output terminal 103 is connected to mass. In the actuator driver circuit 160 of FIG. 3C, the output terminal 103 is connected to a signal output terminal 161 of the actuator driver circuit 160.

In this embodiment, the electrical damping element 100 comprises a differential amplifier or operational amplifier 110 having an inverting input 111 and a non-inverting input 112, and an output 113. A first resistor R1 has one terminal connected to the non-inverting input 112 of the amplifier 110 and has its other terminal connected to element input 101. A second resistor R2 connects amplifier output 113 to said non-inverting input 112 of the amplifier 110. A third resistor R3 has one terminal connected to the amplifier output 113 and has its other terminal connected to element output 103. A fourth resistor R4 has one terminal connected to the inverting input 111 of the amplifier 110 and has its other terminal connected to element output 103. A fifth resistor R5 has one terminal connected to the inverting input 111 of the amplifier 110 and has its other terminal connected to mass.

The electrical damping element 100 behaves as having a negative resistance Rp, defined as Rp=Vout/Iout. In a simplified embodiment, the fourth and fifth resistors R4 and R5 can be omitted, the fourth resistor R4 being replaced by a conductor (zero ohm). As will be clear to a person skilled in the art, the resistance Rp can then be expressed according to $$R_P = -\frac{R_1 \cdot R_3}{R_2}$$

Thus, by suitably selecting the resistance values of the three resistors R1, R2 and R3, it is possible to set the negative resistance Rp of the electrical damping element 100 to a desired value. More degrees of freedom are available when using the fourth and fifth resistors R4 and R5. Likewise, by suitably selecting the resistance values of the resistors R1 to R3 (and possibly R4 and R5), it is possible to set the gain of the electrical damping element 100 to a desired value, as should be clear to a person skilled in the art.

Figure 5:
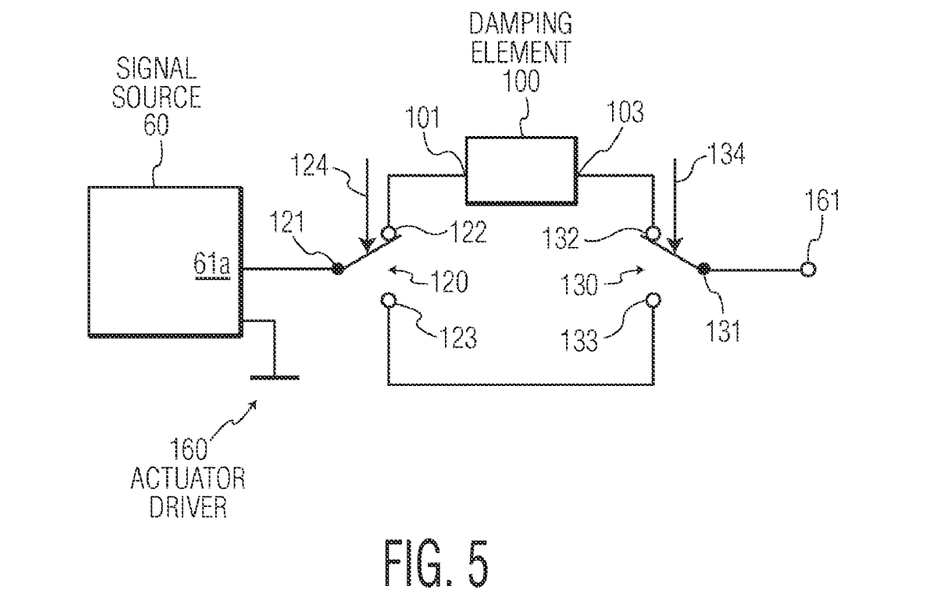
FIG. 5 is a block diagram illustrating an actuator driver circuit having a switchable internal resistance.

In the above examples, the electrical damping element 100 is always active, so that the electrical damping of the actuator is always high. Preferably, the electrical damping is low under normal operative conditions, and can be increased under control of the control unit. FIG. 5 illustrates an embodiment, based on the embodiment of FIG. 3C, where a first controllable switch 120 is incorporated between source output 61a and input terminal 101 of electrical damping element 100. The first controllable switch 120 has a main terminal 121 connected to source output 61a and a first switch terminal 122 connected to input terminal 101 of electrical damping element 100. Further, a second controllable switch 130 is incorporated between circuit output 161 and output terminal 103 of electrical damping element 100. The second controllable switch 130 has a main terminal 131 connected to circuit output 161, a first switch terminal 132 connected to output terminal 103 of electrical damping element 100, and a second switch terminal 133 connected to a second switch terminal 123 of the first controllable switch 120. The first and second controllable switches 120 and 130 have control terminals 124 and 134, respectively, for receiving control signals.

Responsive to the control signal received at its control terminal 124, the first controllable switch 120 is either in a first operative state where its main terminal 121 is connected to its first switch terminal 122 or in a second operative state where its main terminal 121 is connected to its second switch terminal 123. Likewise, responsive to the control signal received at its control terminal 134, the second controllable switch 130 is either in a first operative state where its main terminal 131 is connected to its first switch terminal 132 or in a second operative state where its main terminal 131 is connected to its second switch terminal 133. Thus, in the first operative state of the switches, the damping element 100 is effectively arranged in the signal path from source output 61a to circuit output 161 so that the damping is high, whereas in the second operative state of the switches, the damping element 100 is effectively bypassed so that the damping is low.

The control unit 90 is designed to generate a control signal for the controllable switches 120 and 130, effectively increasing or decreasing the electrical damping of the actuator 50, depending on an operative condition of the actuator. If the control unit 90, on the basis of, for instance, an error signal derived from the optical read signal $S_R$, determines that the actuator has lost its target position, it controls the controllable switches 120 and 130 to take their first operative state, otherwise it controls the controllable switches 120 and 130 to take their second operative state.

For instance, if an error signal indicates that the focus actuator 12 has lost focus, or that the radial actuator 11 has lost track, or in case of absence of the error signal, the control unit 90 controls the controllable switches 120 and 130 of the corresponding actuator driver circuit to take their first operative state, so that the electrical damping of the corresponding actuator is increased. Eventually, the controller(s) for the respective control loop(s) may be switched off. As soon as a suitable error signal is present again and indicates that the focus actuator 12 has regained focus, or that the radial actuator 11 regained track, respectively, the control unit 90 controls the controllable switches 120 and 130 of the corresponding actuator driver circuit to take their second operative state, so that the electrical damping element 100 is bypassed and the electrical damping of the corresponding actuator is decreased. If needed, the controller(s) for the respective control loop(s) will be switched on again.

In another example, if the control unit 90 receives a command indicating a jump to another track, or during a power-up phase, the control unit 90 controls the controllable switches 120 and 130 of the actuator driver circuits to take their first operative state, so that the electrical damping of the corresponding actuator is increased. As soon as the new target track has been reached in a sufficient approximation, or the power-up phase has ended, the control unit 90 controls the controllable switches 120 and 130 of the actuator driver circuits to take their second operative state, so that the electrical damping of the corresponding actuator is decreased.

Figure 6:
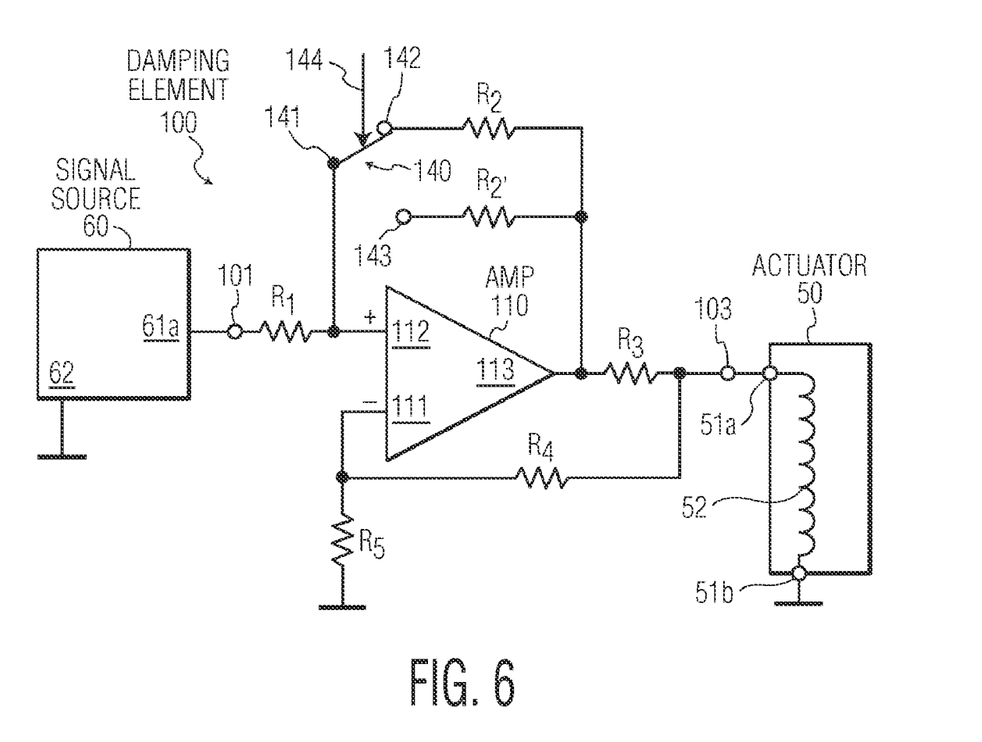
FIG. 6 is a block diagram illustrating an actuator driver circuit having a switchable internal resistance.

In the above, it is explained that the negative resistance element 100 is either switched on or off as a whole. However, it is also possible to selectively change the resistance value of the negative resistance element 100 in order to increase/decrease the resistance value as desired. FIG. 6 illustrates an embodiment, based on the embodiment of FIG. 3A, where a controllable switch 140 is incorporated between non-inverting input 112 of amplifier 110 and second resistor R2. The controllable switch 140 has a main terminal 141 connected to non-inverting input 112 of amplifier 110 and a first switch terminal 142 connected to second resistor R2. A second switch terminal 143 is connected to a terminal of an alternative second resistor R2', which has its other terminal connected to amplifier output 113. This controllable switch 140 has a control terminal 144, for receiving control signals.

Responsive to the control signal received at its control terminal 144, the controllable switch 140 is either in a first operative state where its main terminal 141 is connected to its first switch terminal 142 so that the original second resistor R2 is operative, or in a second operative state where its main terminal 141 is connected to its second switch terminal 143 so that the alternative second resistor R2' is operative. Referring to the expression Rp=−R1×R3/R2 as given above, it will be clear that the damping is changed by switching operative resistors.

This switching of resistors is not restricted to one resistor; it is possible that two or more of the components of element 100 are switched in order to change the characteristic features of the element 100, especially the resistance value and/or gain.

Switching resistors is not restricted to two alternative values; it is possible that three or more alternative resistors are available for any resistor position, associated with a controllable switch having three or more states.

It is noted that, if the damping of an actuator is changed, time-constants of a corresponding actuator controller change also.

It should be clear to a person skilled in the art that the present invention is not limited to the exemplary embodiments discussed above, but that various variations and modifications are possible within the protective scope of the invention as defined in the appending claims.

For instance, the present invention can be used to increase the damping of an actuator in an BluRay disc drive, a DVD+RW drive, a CD drive, an SFFO drive, etc. Application of the present invention may result in higher speed, better playability, and better shock-insensitivity, which is especially important in portable drives. However, the present invention is not restricted to the field of optical disc drives. The proposals of the present invention are also applicable in magnetic disc drives. But, more generally, the present invention can be applied in any situation where it is desirable to increase the damping of an actuator, not necessarily being part of a disc drive apparatus.

Further, selectively switching a damping element into or out of the signal path can also be implemented in actuator arrangement embodiments as illustrated in FIGS. 3A-B, whereas selectively switching one or more of the components of the electrical damping element can also be implemented in an actuator arrangement embodiment as illustrated in FIG. 3B or in an actuator circuit embodiment as illustrated in FIG. 3C.

The invention claimed is:

1. A method for driving an actuator, the method comprising the act of changing electrical damping of the actuator by selectively activating at least one switch, in response to a control signal from a controller, for switching in or out an electrical damping element providing a negative resistance, wherein the electrical damping element is connected in series with the controller and the actuator.

2. The method of claim 1, wherein the electrical damping of the actuator is changed by changing an electrical resistance of an actuator drive loop.

3. The method of claim 1, wherein the electrical damping of the actuator is increased with respect to the damping during normal operative conditions when an actuator position deviates from a target position, and wherein the electrical damping of the actuator is decreased to the normal damping when the actuator has recovered the target position.

4. The method of claim 1, applied in an optical disc drive for radially driving an objective lens radial actuator, wherein the electrical damping of the radial actuator is increased when a radial error signal indicates a radial error exceeding a predefined threshold, or when the radial error signal becomes absent;

and wherein the electrical damping of the radial actuator is decreased to the normal damping when the radial error signal indicates said radial error decreasing below said predefined threshold, or when the radial error signal returns, respectively.

5. The method of claim 1, applied in an optical disc drive for axially driving an objective lens focus actuator, wherein the electrical damping of the focus actuator is increased when a focus error signal indicates a focus error exceeding a predefined threshold, or when the focus error signal becomes absent;

and wherein the electrical damping of the focus actuator is decreased to the normal damping when the focus error signal indicates said focus error decreasing below said predefined threshold, or when the focus error signal returns, respectively.

6. The method of claim 1, applied in an optical disc drive for radially driving an objective lens radial actuator or for axially driving an objective lens focus actuator, wherein the electrical damping of the actuator is increased in response to a command indicating a jump to another track, or during a power up phase, and wherein the electrical damping of the actuator is decreased to the normal damping when the new target track has been reached or when the power up phase has ended, respectively.

7. The method of claim 1, wherein the electrical damping element is connected in between the controller and the actuator.

8. An actuator driver circuit comprising:
a negative resistance including an input resistor, a first resistor and a second resistor; and
at least one switch for selectively connecting the input resistor to the first resistor or the second resistor in response to a control signal from a controller.

9. A disc drive apparatus for reading or writing a disc, the apparatus comprising a pickup element and at least one actuator for manipulating the pickup element;
wherein the disc drive apparatus comprises the actuator driver circuit according to claim 8.

10. The disc drive apparatus according to claim 9, wherein said pickup element is an objective lens of an optical system for scanning tracks of an optical disc.

11. The actuator driver circuit of claim 8, wherein the negative resistance is connected in series with the controller.

12. An actuator driver circuit for actuating an actuator having a first terminal and a second terminal, the actuator driver circuit comprising a drive signal source connected to the first terminal of the actuator, and an electrical damping element having a negative resistance connected between the second terminal of the actuator and ground, wherein the first terminal is configured to receive the drive signal and is different from the second terminal.

13. The actuator of claim 12, comprising controllable means for selectively switching said electrical damping element into or out of a signal path from the actuator to the ground.

14. The actuator of claim 12, comprising controllable means for selectively switching components of said electrical damping element into or out of operation in order to adjust damping properties of the electrical damping element.

15. An actuator assembly comprising:
an actuator having a first terminal and a second terminal,
a drive signal source connected to the first terminal of the actuator, and
an electrical damping element having a negative resistance connected between the second terminal of the actuator and ground, wherein the first terminal is configured to receive a drive signal from the drive signal source and is different from the second terminal.

16. The actuator of claim 15, further comprising controllable means for selectively switching said electrical damping element into or out of a signal path between the second terminal of the actuator and the ground.

17. The actuator of claim 15, further comprising controllable means for selectively switching components of said electrical damping element into or out of operation in order to adjust damping properties of the electrical damping element.

18. An actuator driver circuit comprising:
a negative resistance including an input resistor, a first resistor and a second resistor; and
at least one switch for selectively connecting the input resistor to the first resistor or the second resistor in response to a control signal from a controller, wherein the negative resistance further includes an operational amplifier having an inverting input and an output, the input resistor and the at least one switch being connected to the inverting input, and the second resistor being connected between the at least one switch and the output.

19. The actuator driver circuit of claim 18, wherein the operational amplifier further has a non-inverting input, the non-inverting input being connected to the ground through a further resistor.

20. An actuator driver circuit comprising:
a negative resistance including an input resistor, a first resistor and a second resistor; and
at least one switch for selectively connecting the input resistor to the first resistor or the second resistor in response to a control signal from a controller, wherein the negative resistance is connected in series between the controller and an actuator driven by the actuator driver circuit.

* * * * *